United States Patent
Prudvi et al.

(10) Patent No.: US 6,401,172 B1
(45) Date of Patent: Jun. 4, 2002

(54) RECYCLE MECHANISM FOR A PROCESSING AGENT

(75) Inventors: Chinna Prudvi; Derek T. Bachand, both of Portland; David L. Hill, Cornelius, all of OR (US)

(73) Assignee: Intel Corp., Santa Clara, CA (US)

( * ) Notice: Subject to any disclaimer, the term of this patent is extended or adjusted under 35 U.S.C. 154(b) by 0 days.

(21) Appl. No.: 09/215,534

(22) Filed: Dec. 18, 1998

(51) Int. Cl.[7] ............................................... G00F 18/12
(52) U.S. Cl. ..................... 711/141; 711/143; 711/144; 711/145; 711/140
(58) Field of Search ............................... 711/141, 144, 711/145, 113, 140, 211, 5, 122, 127, 150, 118, 143; 712/225; 709/253

(56) References Cited

U.S. PATENT DOCUMENTS

| | | | | |
|---|---|---|---|---|
| 5,367,648 A | * | 11/1994 | Chuang et al. | 712/225 |
| 5,655,102 A | * | 8/1997 | Galles | 711/150 |
| 5,732,409 A | * | 3/1998 | Ni | 711/113 |
| 5,809,530 A | * | 9/1998 | Samra et al. | 711/140 |
| 5,829,026 A | * | 10/1998 | Leung et al. | 711/122 |
| 5,835,965 A | * | 11/1998 | Taylor et al. | 711/211 |
| 5,848,428 A | * | 12/1998 | Collins | 711/127 |
| 5,924,111 A | * | 7/1999 | Huang et al. | 711/5 |
| 5,991,819 A | * | 11/1999 | Young | 709/253 |
| 6,014,756 A | * | 1/2000 | Dottling et al. | 714/15 |
| 6,108,753 A | * | 8/2000 | Bossen et al. | 711/118 |
| 6,134,635 A | * | 10/2000 | Reams | 711/150 |
| 6,173,369 B1 | * | 1/2001 | Nguyen et al. | 711/140 |

* cited by examiner

Primary Examiner—Matthew Kim
Assistant Examiner—Brian R. Peugh
(74) Attorney, Agent, or Firm—Kenyon & Kenyon

(57) ABSTRACT

A method of processing a data request in a processing agent. The method comprises posting the data request internally within the agent and, if the data request implicates data associated with a pending external transaction, canceling and recycling the data request.

11 Claims, 5 Drawing Sheets

RECYCLE MECHANISM FOR A PROCESSING AGENT

BACKGROUND

The present invention provides a recycle mechanism in a processing agent to guard against data corruption.

As is known, certain processing agents may store data in internal caches. The caches store data for quick use by the agent. The cache stores data in cache lines, each having a predetermined width. However, the cache may furnish requested data in granularities smaller than an entire cache line. For example, the cache may furnish data in one-half or one-quarter cache line granularities.

The present invention protects against data corruption events that may occur when the core issues two requests alternately to different portions of a single cache line. When the requests are issued in quick succession, the first request may not complete before the second request is posted. If the requests each were processed independently, it would be possible for the agent to retrieve two copies of data from a single address and place the copies in different locations within the internal cache. A host of data corruption errors become possible when two copies of the same data are provided in two places in a single internal cache. For example, the agent could modify one of the copies. Thereafter, depending upon which copy were used the different values of the same data could cause the agent to behave differently.

Accordingly, there is a need in the art for a data management system in an agent that manages data and prevents the agent from storing two copies of the same data in different locations of the same cache.

SUMMARY

An embodiment of the present invention provides a method of processing a data request in an agent in which the data request is posted internally within the agent and, when the data request implicates data associated with a pending external transaction, the data request is recycled.

DETAILED DESCRIPTION

The present invention provides a recycling mechanism that prevents multiple requests to portions of a single address from being posted externally by an agent. According to the present invention, when a request is issued within the agent, the request is checked against an internal cache to determine whether the agent has the data in an internal cache. If not, the request is checked against previously queued pending transactions. If the address of the new request matches the address of a pending transaction, the new request is recycled. Otherwise, the new request is posted as a new transaction. Embodiments of the present invention employ the recycle mechanism to treat certain boundary conditions that may occur in processing agents.

Figure 1:
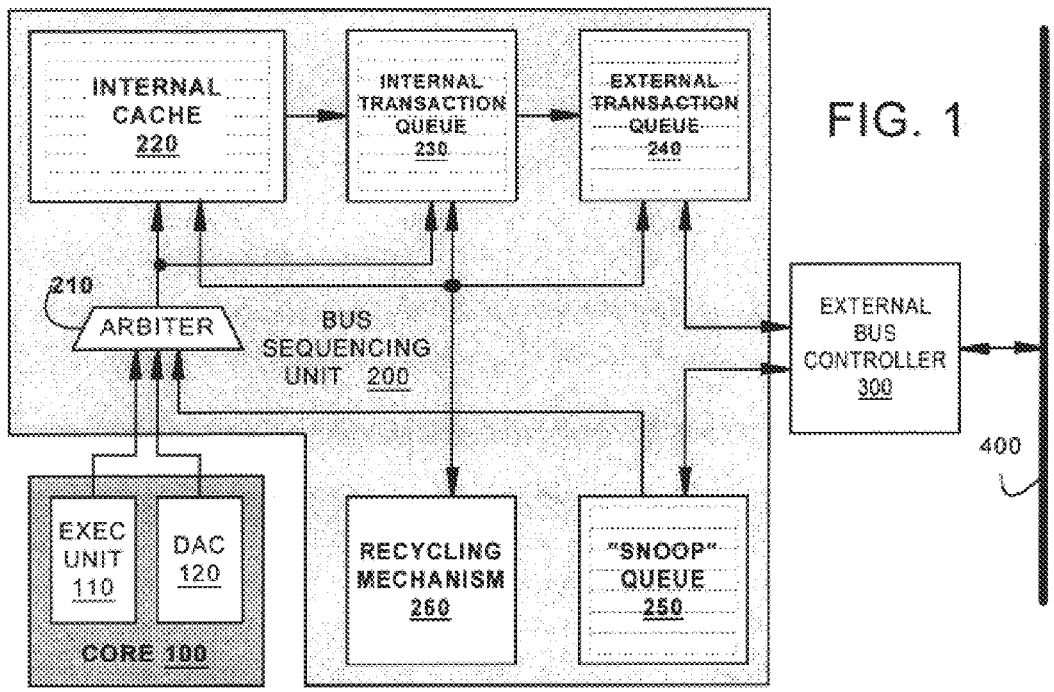
FIG. 1 illustrates an agent constructed in accordance with a embodiment of the present invention.

The principles of the present invention are best understood in the context of an agent, such as the embodiment shown in FIG. 1. The agent may possess a core 100, a bus sequencing unit 200 ("BSU") and an external bus controller 300 ("EBC"). The core 100 executes instructions and manipulates data as directed by the instructions. The BSU 200 manages data requests that may be issued by the core 100. The EBC 300 interfaces the BSU 200 to an external bus 400. The external bus 400 interfaces the agent to other components in a computer system (not shown) such as an external memory.

The core 100 includes an execution unit 110 that executes program instructions. It also includes a data access controller 120 ("DAC") that contains variable data. The variable data in the DAC 120 may be read and/or modified according to program instruction. Herein, "data" may refer alternatively to program instruction, variable data, or both. The instruction unit 110 or the DAC 120 may issue data requests to the BSU 200.

The BSU 200 may include an arbiter 210, an internal cache 220, an internal transaction queue 230, an external transaction queue 240, a snoop queue 250 and a recycle mechanism 260. The arbiter 210 receives data requests from not only the core 100 but also from a variety of other sources (such as the snoop queue 250). Of the possibly several data requests received simultaneously by the arbiter 210, the arbiter 210 selects and outputs one of them to the remainder of the BSU 200.

The internal cache 220 stores data in several cache entries. It possesses logic (not shown) that determines whether a data request "hits" (implicates data in) the cache 220 and, if so, it implements the data request.

The internal transaction queue 230 receives and stores data requests issued by the arbiter 210. It receives signals from the internal cache 220 indicating whether the data request hit the internal cache 220. If not, if the data request "misses" the internal cache 220, the internal transaction queue 230 forwards the data request to the external transaction queue 240.

The external transaction queue 240 interprets requests and generates external bus transactions to fulfill them. The external transaction queue 240 is populated by several queue entries. The external transaction queue 240 manages the agent's transactions as they progress on the external bus 400. For example, when requested data becomes available in response to a read transaction, the external transaction queue 240 retrieves the data and forwards it to the "requestor" (for example, the core 100).

The snoop queue 250 performs cache coherency checks within the agent. Typically, in response to a new bus transaction issued by another agent, the snoop queue 250 generates snoop probes to various caches within the agent (such as internal cache 220) and to the internal and external transaction queues 230, 240. It receives responses to the snoop probes and generates snoop responses therefrom. If necessary, the snoop queue 250 manages implicit writebacks of modified data from the agent.

The recycling mechanism 260 contains logic that implements recycling functions described herein. The logic of the recycling mechanism 260 may be a discrete unit in the BSU 200 or may be distributed throughout, for example, the internal cache 220, the internal transaction queue 230 and/or the external transaction queue 240.

The external bus controller 300 drives signals on the external bus 400 as commanded by the external transaction queue 240 and snoop queue 250.

Figure 2:
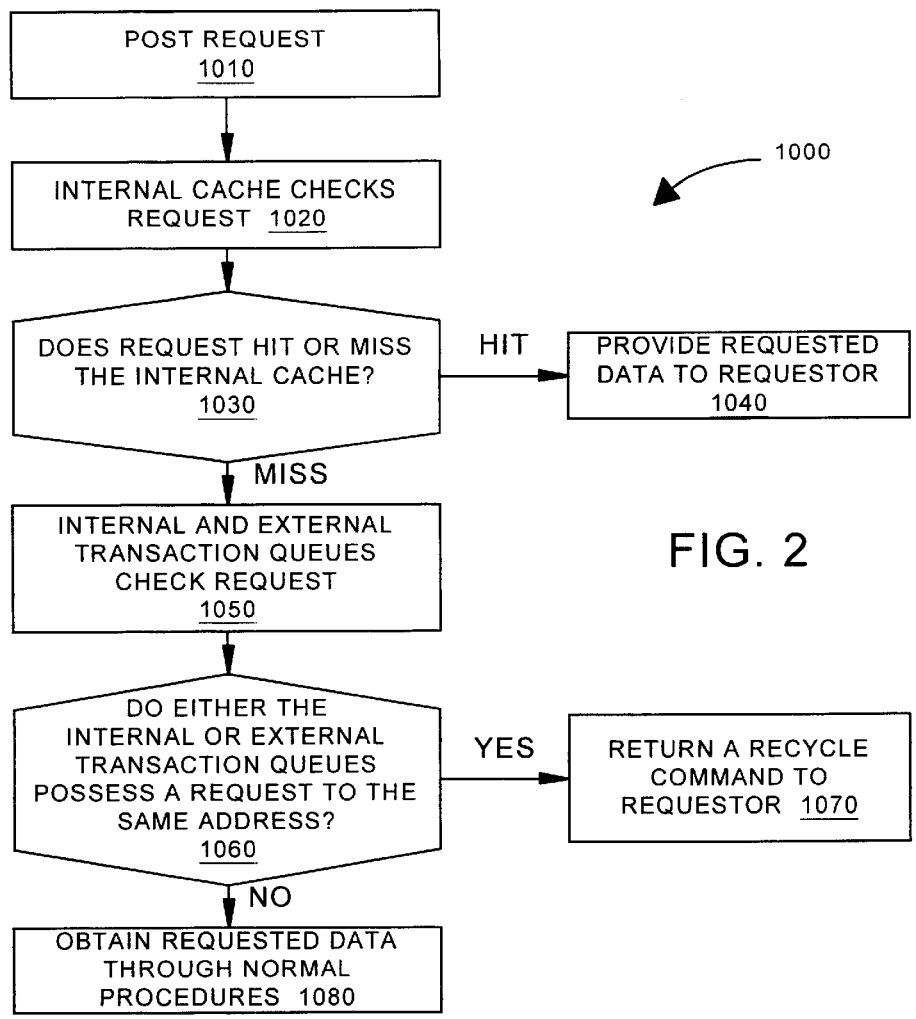
FIG. 2 illustrates a method of an agent operating in accordance with an embodiment of the present invention.

FIG. 2 illustrates a method 1000 of the agent operating in accordance with an embodiment of the present invention. The method 1000 prevents multiple read requests to the same data from being posted on the external bus 400 (FIG. 1). According to the method, a "requester" (such as the core 100) posts a data request according to normal techniques (Step 1010). The data request includes an address identifying affected data. The internal cache 220 checks the address against addresses of data that it has stored to determine if the requested data is present in the cache (Steps 1020-1030). If the request "hits" the cache, the requested data is present in the cache. It is furnished to the requestor (Step 1040).

If the request misses the cache, the recycling mechanism 260 compares the address of the request against addresses of pending transactions stored in the internal and external transaction queues 230, 240 (Step 1050). The recycling mechanism 260 determines whether an address of any pending transaction matches the address of the new data request (Step 1060). A match indicates that a pending transaction will retrieve the data requested by the new data request. Accordingly, in response to a match, the recycling mechanism 260 causes the data request to be recycled (Step 1070).

If no match occurs, the data request is processed according to conventional processes (Step 1080). In the embodiment of FIG. 2, the data request advances from the internal transaction queue 230 to the external transaction queue 240.

It is conventional in processing agents for data requests to be retried. As noted with respect to FIG. 1, the arbiter 210 may receive several simultaneous data requests from many components within the agent including, for example, the core's execution unit 110 and DAC 120 as well as the snoop queue 250. The arbiter 210 selects one of the data requests and denies the others. Denied requests are retried. The arbiter 210 generates signals informing requesting components whether their respective request was granted or denied. In an embodiment, the recycling mechanism 260 may be integrated with this protocol.

Figure 3:
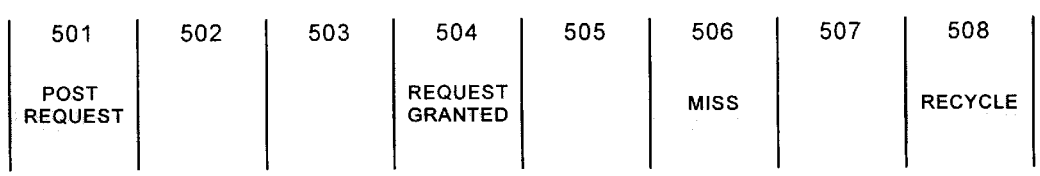
FIG. 3 illustrates a timing diagram of events that may occur in response to a data request according to an embodiment of the present invention.

FIG. 3 illustrates a timing diagram of an exemplary data request as it propagates through an embodiment of the present invention. The "life" of a data request may last over a plurality of clock cycles 501–508. In clock cycle 501, for example, the requestor posts the data request to the arbiter 210. The requests propagates through the arbiter 210 over a predetermined number of clock cycles. The number of cycles is pre-established so that, at a predetermined time after the request is posted (cycle 504), the requestor receives a signal from the arbiter 210 indicating whether the request is granted or denied. If granted, the request is input to the internal cache 220 and the internal transaction queue 230. The internal cache 220 determines whether the request hits the cache 220. Again, the requestor receives a hit or miss signal at a predetermined cycle after its request is granted (cycle 506). If the request misses the cache, the recycling mechanism 260 checks determine whether to recycle the request. A recycle command, if any, may be generated a predetermined time after the miss signal (cycle 508). In an embodiment, the recycle command may use a signal pattern similar to the signal pattern that characterizes the retry command.

FIG. 3 illustrates relationships that may exist between the recycle command and other events in certain embodiments of the present invention. The precise timing relationships, however, are illustrative only and should not be construed to limit the scope of the invention.

Figure 4:
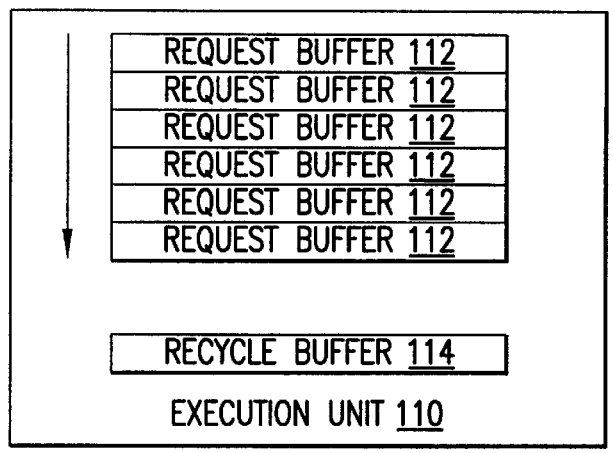
FIG. 4 illustrates an execution unit constructed in accordance with an embodiment of the present invention.

In known processing agents, data requests may be stored in the core 100 in a plurality of request buffers prior to being posted to the arbiter 210 (FIG. 1). Request buffers 112 of an exemplary execution unit 110 are illustrated in FIG. 4. Logic (not shown) sequentially advances through the request buffers 112 in a "request cycle," posting data requests stored in each. A data request is cleared from a request buffer 112 when the arbiter 210 grants the request. If the request is denied, however, the data request remains in the request buffer 112 and is retried when the request cycle returns.

A recycled request is retried also. The data request ordinarily may remain in the request buffer 112 and be retried when the request cycle returns. However, because transactions on the external bus 400 proceed slowly relative to the core 100 and BSU 200, a pending transaction that caused the data request to be recycled in the first instance may not conclude before the request cycle returns to the data request. Indeed, in certain situations, the data request could be retried and recycled several times before the pending transaction clears. Accordingly, in an embodiment of the present invention, the core 100 may be provided with a timer (not shown) that prevents a recycled data request from being retried for a predetermined period of time. If the request cycle returns to the recycled data request during the period, the request cycle skips the recycled data request and advances to the next request buffer 112 in the cycle. Once the period expires, the requesting cycle is permitted to post the recycled data request to the arbiter 210.

In an alternate embodiment, the core 100 may be provided with a recycle buffer 114. A recycled request may be moved to the recycle buffer 114 for a period of time. This alternate embodiment permits other data requests to be stored in the request buffer 112 formerly occupied by the recycled request. Once the period expires, the recycled request may be moved from the recycle buffer 114 to the same or another request buffer 112 for retry.

Recycling of Transactions to the Same "Set"

Embodiments of the recycling mechanism are applicable to treat boundary conditions that may arise during operation of the agent. One such boundary condition arises when the internal cache 220 is a set associative cache.

Figure 5:
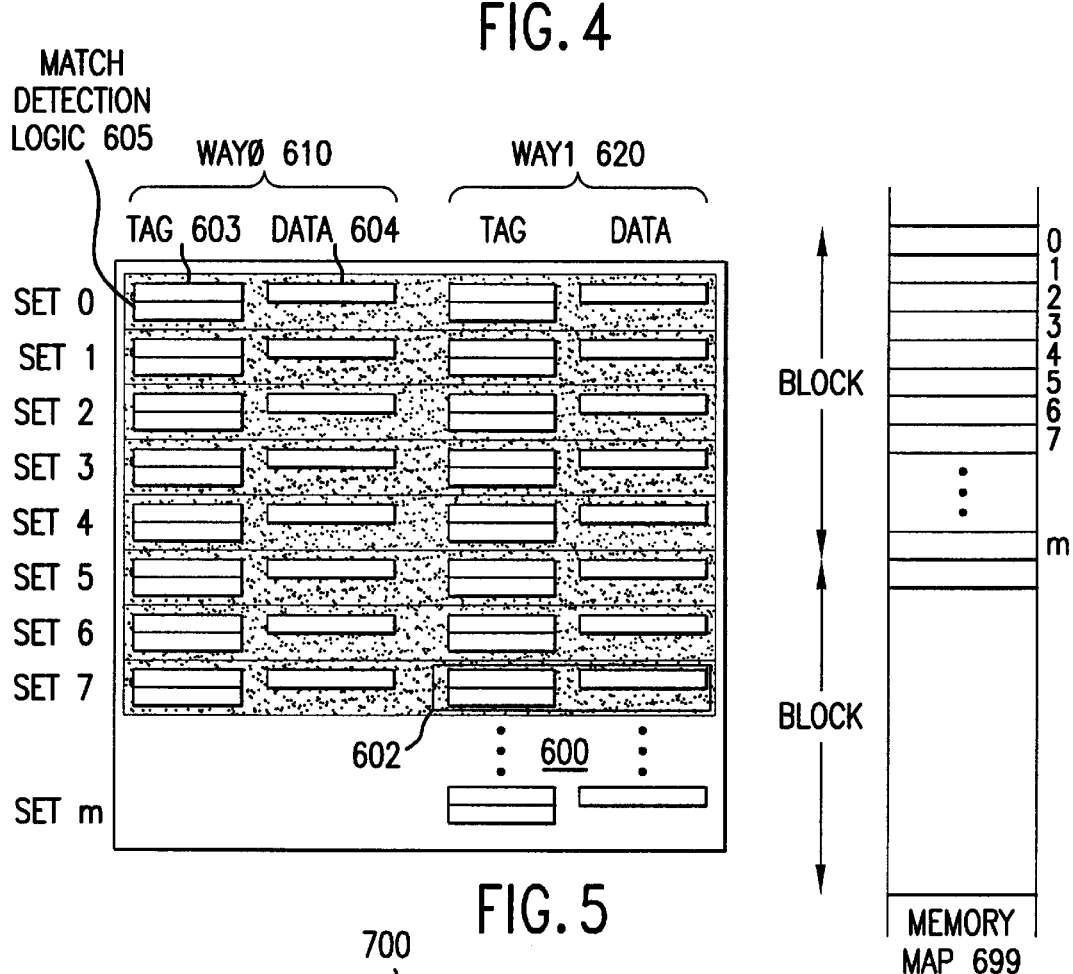
FIG. 5 illustrates a set associative memory constructed in accordance with the present invention.

FIG. 5 illustrates a set associative cache 600 appropriate for use in an embodiment of the present invention. The set associative cache 600 includes cache entries 602. Each cache entry includes a tag portion 603 and a data portion 604. The data portion 604 stores a predetermined amount of data from external memory, called a "cache line." The data portion may also store additional administrative information associated with the data, such as error correction codes and cache coherency information.

The cache entries 602 are organized into an array of "sets" and "ways." FIG. 5 also illustrates a memory map 699 representing data entries in an external memory. External memory may be divided into blocks of memory lines, each having a depth equal to the depth (number of sets m) of the internal cache 600. A cache line from a position 0 in a block will be stored by the cache in set 0. A cache line from position 1 in the same block will be stored by the cache in one of the ways of set 1. Two items of data, each occupying the same position in their respective blocks, may be stored simultaneously by the cache 600 provided they are stored in different ways 610–620. Only two ways 610–620 are illustrated in FIG. 5; there may be more.

Figure 6:
FIG. 6 illustrates an address according to an embodiment of the present invention.

FIG. 6 illustrates a memory address 700 according to an embodiment of the invention. A memory address 700 may include several fields including a "tag" field 710, "set" field 720 and an "offset" field 730. When data is stored in the cache 600 (FIG. 5), it is stored in a set identified by the set field 720. The tag field 710 is stored in the tag portion 603 of the cache entry 602. The offset field 730 optionally may identify data within a cache line.

The tag portion 603 of cache entries 602 includes match detection logic 605. When a new data request is input to the cache 600, the cache 600 provides the tag field 710 from the request's address to the match detection logic 605 of each cache entry 602 in the set identified by set field 720. A match indicates that the request hit the cache 600. Optionally, other conditions may have to be met, however, before the internal cache 600 indicates that the request hit the cache. For example, certain cache coherency states may indicate that a copy of data is inappropriate for the type of data request posted even though the data is stored in the cache 600. In such a case, the cache 600 may indicate that a request misses the cache 600 even though the request matches the tag and set of data stored in the cache 600.

The boundary condition arises when the BSU 200 process two transactions simultaneously having addresses that reference the same set. Consider an example where all cache entries 602 in a particular set (say, set 0) store data. The core issues a first data request that implicates set 0 but misses the cache 600. That is, none of the tags stored in set 0 match the tag field 710 of the new request. The internal cache selects a victim cache entry 602 in set 0 (say, way 1) and the request is stored in the internal and external transaction queues 230 and 240.

While the first request is pending, the core 100 may issue other data requests. Pursuant to a second data request, the core 100 may read in the data from the victim data entry and modify it. It may return the modified data to the victim cache entry without updating external memory. The modified data becomes the most current copy of the data present in the system. Thereafter, if the data for the first request is permitted to be stored in the victim data entry, the modified data would be lost to the system.

Figure 7:
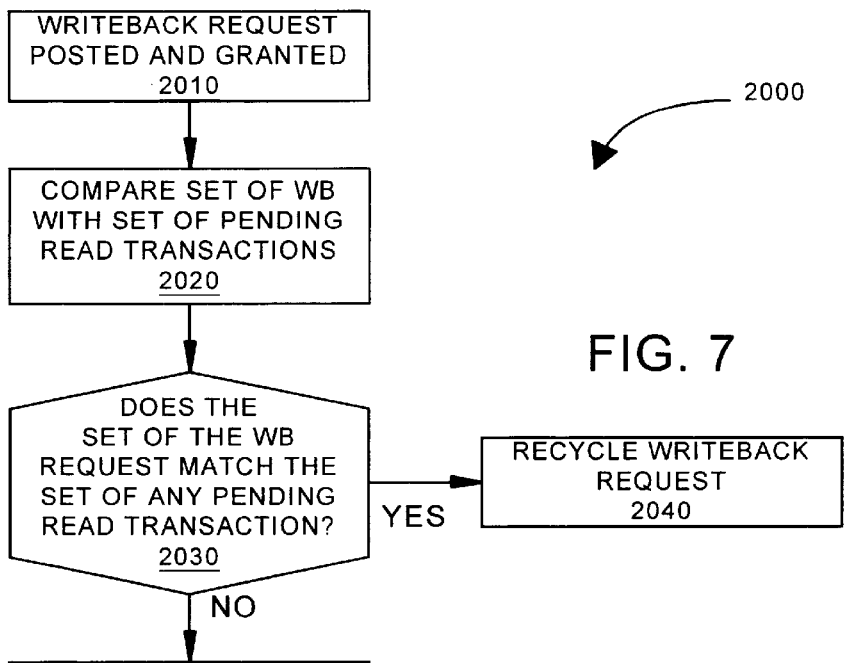
FIG. 7 illustrates a method according to an embodiment of the present invention.

FIG. 7 illustrates a method 2000 of the recycle mechanism according to an embodiment of the present invention. The method protects against the boundary condition by inhibiting a writeback of modified data when there exists a pending transaction directed to the same set. Initially, the writeback request is posted and granted by the arbiter 210 (step 2010). The request hits the cache 220. Before the data is stored in the internal cache 220, the recycle mechanism 260 checks the set of the modified data against the set of transactions pending in either the internal or external, queue 230 and 240 (steps 2020–2030). If the sets match, the writeback request is recycled until the pending transaction concludes (step 2040). Otherwise, the writeback request proceeds normally (step 2050).

Consider again the two request examples given above. The first request misses the cache 220 and is queued in the internal or external transaction queue 230 and 240. The cache entry in set 0, way 1 has been selected as a victim data entry. Pursuant to the second transaction, data from the victim data entry is read by the core 100 and modified. When the core 100 is prepared to write the modified data back to the internal cache 220, the core 100 posts a writeback request. The recycling mechanism 260 determines that the set of the writeback request matches the set of the first transaction. Therefore, the writeback request is recycled.

The core 100 may continue to issue the writeback request. Subsequent writeback requests are recycled until the first transaction completes and the data requested for the first transaction is stored in the victim data entry. Thereafter, when the writeback request is reissued, the request is permitted to proceed. The request misses the internal cache 220 because the tag of the victim data entry now stores the tag of the first transaction rather than the modified data. The writeback request may cause a new entry to be selected through the victim selection algorithm or may be written back to external memory.

Thus, the recycling mechanism can be used to present inadvertent loss of modified data that could occur if the modified data were stored in a cache entry that has been selected as a victim pursuant to an earlier posted request.

Recycling in Response to Corrupted Data

According to another embodiment of the present invention, the recycling mechanism 200 may be used to prevent multiple requests for data that has been corrupted. As is known, data may be stored in a cache 220 in association with error correction codes. The error correction codes permit corrupted data to be detected and perhaps corrected. When corrupted data is detected, correct data may be obtained by reading a new copy from external memory or by passing the corrupted data through an error correction circuit (not shown) within the agent. An external bus transaction may be used in either instance, according to an embodiment of the present invention.

Figure 8:
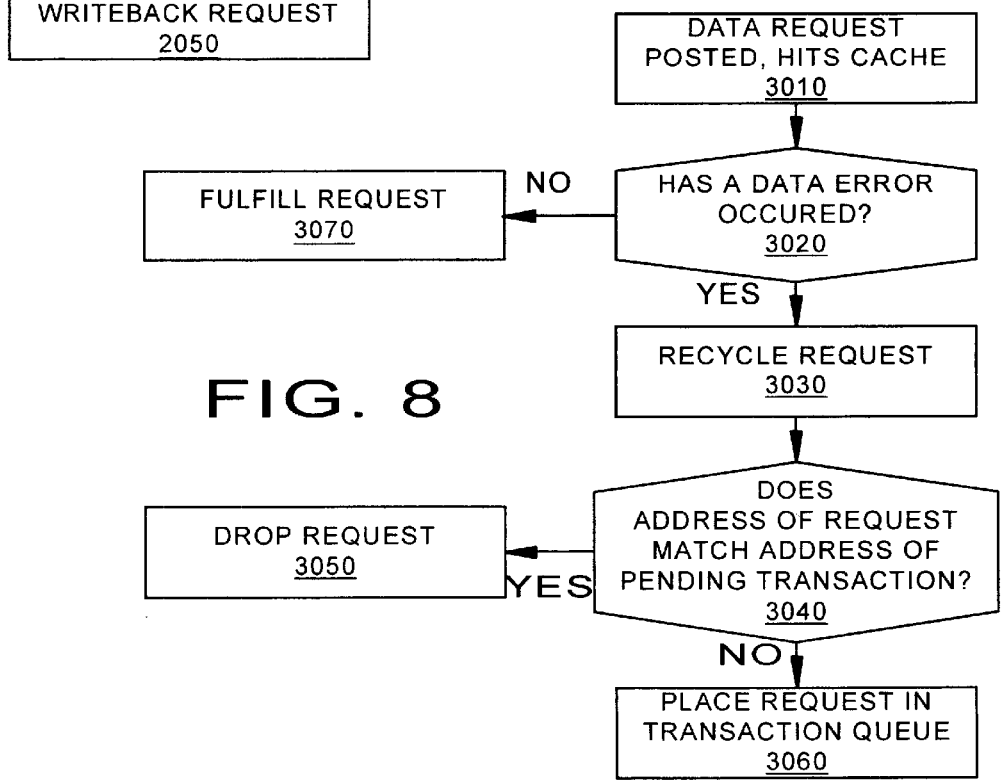
FIG. 8 illustrates a method according to another embodiment of the present invention.

FIG. 8 illustrates a method 3000 of the recycling mechanism in accordance with an embodiment of the present invention. According to the method 3000, a data request is posted. It hits the cache 220 (step 3010). Through error correction codes, the cache 220 determines whether a data error occurred (step 3020). If so, the recycling mechanism 260 recycles the data request (step 3030).

Further, the recycling mechanism 260 compares the address of the request against the addresses of the data request against the address of pending transactions stored in the internal and external transactions queues 230, 240 (step 3040). If the address of the request matches the address of a pending transaction, the request is dropped (step 3050). Otherwise, the request progresses from the internal transaction queue 230 to the external transaction queue 240 (step 3060).

If no data error occurs, the request is fulfilled through conventional procedures (step 3070).

In this embodiment, when a data request hits the internal cache but a data error is detected, the data request is automatically recycled. The requestor will retry the data request sometime later. However, the data request is also stored in the internal transaction queue 230 and advances to the external transaction queue 240.

Eventually, the requestor may retry the request. Again, the request hits the internal cache 220 and data error is detected. The request again is recycled. When the data error is detected, the recycle logic 260 (FIG. 1) compares the address of the data requests against the addresses of the internal and external transaction queues 230 and 240. A match will be detected if the request had been queued previously. If a match occurs, the request is dropped. Thus, data corruption causes only one request to be stored in the transaction queues 230 and 240 no matter how many times the data request is retried.

Recycle for Writeback Conflicts

Another boundary condition arises in the case of a writeback conflict. A writeback conflict may occur when a copy of data for the same address is stored in both the DAC 120 and the internal cache 220 in modified state. This may occur when data is modified by the core 100 and stored in the internal cache 220, then modified a second time. The copy in the internal cache 220, although modified and more current than the copy stored in external memory is not the most current copy in the system. The copy in the DAC 120 is the most current copy. However, because the copy in the internal cache 220 is modified, if it were evicted pursuant to another transaction, it would be written back from the cache to external memory pursuant to a write transaction. A write transaction is loaded in the internal transaction queue 230 which propagates to the external transaction queue 240 and, eventually, to the external bus 400.

If the DAC 120 evicts its copy of the modified data while the first write transaction is pending in the external transaction queue 240, it posts a write back data request to the arbiter 210. The writeback data request misses the internal cache 220 and is stored in the internal transaction queue 230. It would be possible that both writeback transactions would be stored in the external transaction queue 240 simultaneously. If this occurred, it is possible that the request from the DAC 120 would be posted on the external bus 400 first, followed by the request from the internal cache 220. The most current copy of data would be stored in external memory only to be overwritten by a stale copy soon thereafter.

Figure 9:
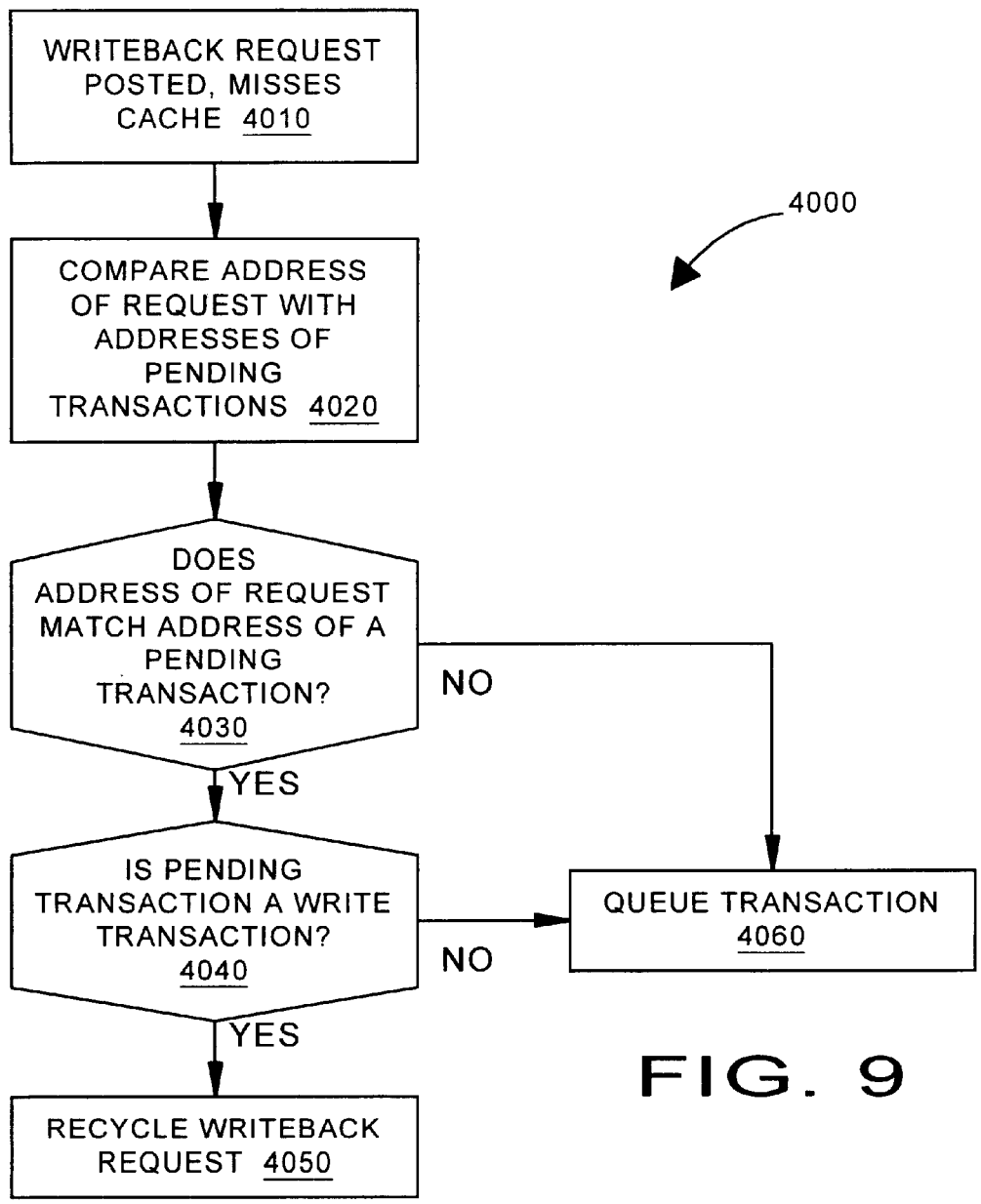
FIG. 9 illustrates a method according to a further embodiment of the present invention.

FIG. 9 illustrates a method 4000 of the BSU 200 according to an embodiment of the present invention. In an embodiment, the recycling mechanism 260 prevents two writeback transactions to the same memory location from being stored simultaneously in the external transaction queue 240. A writeback transaction is posted and misses the internal cache 220 (step 4000). The recycling mechanism 260 compares the address of the writeback transaction with addresses of other transactions pending in the internal and external transaction queues 230, 240 (step 4020). If a match occurs (step 4030), the recycling mechanism 260 reads the request type of the matching pending transaction to determine if it is a write transaction (step 4040). If so, the recycling mechanism recycles the new writeback request (step 4050). Optionally, the recycling mechanism may operate according to the timing illustrated by FIG. 3.

Recycling When the Internal Transaction Queue Is Full

Figure 10:
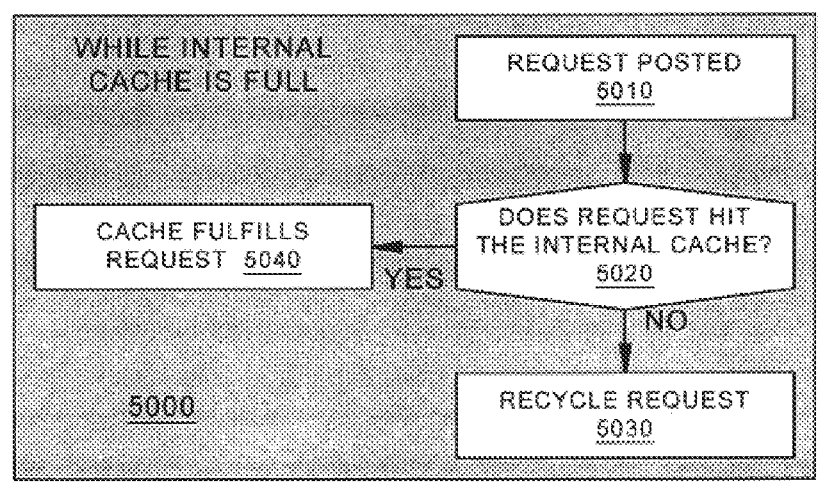
FIG. 10 illustrates a method according to another embodiment of the present invention.

Another boundary condition occurs when the internal transaction queue 230 becomes full. In an embodiment, the BSU 200 may operate according to the method 5000 of FIG. 10. When the internal transaction queue 230 is full, the BSU 200 may accept new data requests that hit the internal cache 220 but no others. In an embodiment, when the internal transaction queue is full, the arbiter continues to accept new data requests and post them internally to the BSU 200 (step 5010). The internal cache 220 determines whether the request hits the cache 220 (step 5020). If the internal transaction queue 230 is full, the recycling mechanism recycles any request that misses the internal cache 220 (step 5030). However, it permits any request that can be fulfilled by the internal cache 220 to be fulfilled by the internal cache 220 (step 5040).

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of processing a data request in an agent, comprising:

posting the data request internally within the agent, determining whether the data request hits an internal cache, and if not, when the data request implicates data associated with a pending external transaction, recycling the data request and disabling for a time a request buffer storing the data request.

2. A method of processing a data request in an agent, comprising:

posting the data request internally within the agent, determining whether the data request hits an internal cache, and if not, when the data request implicates data associated with a pending external transaction, recycling the data request and moving the data request from a request buffer to a recycle buffer.

3. A bus sequencing unit in a processing agent, comprising:

a set associative cache having an input for data requests posted within the bus sequencing unit, a transaction queue system having an input for the data requests, and a recycling mechanism in communication with the internal cache and the transaction queue system;

wherein the recycling mechanism returns to a requester a recycle signal corresponding to the data request whenever the data request implicates data associated with a pending external transaction; and further wherein the recycle mechanism is adapted to inhibit a writeback that hits the cache when the transaction queue system stores a pending read transaction related to the same set as the writeback request.

4. A bus sequencing unit in a processing agent, comprising:

a cache having an input for data requests posted within the bus sequencing unit, a transaction queue system having an input for the data requests, and a recycling mechanism in communication with the internal cache and the transaction queue system;

wherein the recycling mechanism returns to a requester a recycle signal corresponding to the data request whenever the data request implicates data associated with a pending external transaction, wherein the cache includes cache entries and a data error detector, and the recycling mechanism is provided in communication with the error detector and is adapted to recycle a data request in response to data error.

5. A bus sequencing unit in a processing agent, comprising:

a cache having an input for data requests posted within the bus sequencing unit, a transaction queue system having an input for the data requests, and a recycling mechanism in communication with the internal cache and the transaction queue system;

wherein the recycling mechanism returns to a requestor a recycle signal corresponding to the data request whenever the data request implicates data associated with a pending external transaction;

wherein the cache includes cache entries, each cache entry including a state field representing a cache coherency state of data in the cache entry, and further wherein the recycling mechanism is adapted to recycle any writeback request posted within the bus sequencing unit.

6. A bus sequencing unit in a processing agent, comprising:

a cache having an input for data requests posted within the bus sequencing unit, a transaction queue system having an input for the data requests, and a recycling mechanism in communication with the internal cache and the transaction queue system;

wherein the recycling mechanism returns to a requester a recycle signal corresponding to the data request whenever the data request implicates data associated with a pending external transaction;

wherein the transaction queue system includes an internal transaction queue, wherein the internal transaction queue includes a queue full indicator output, and wherein the recycling mechanism possesses logic in communication with the queue full indicator output and adapted to recycle any data request that misses the internal cache when the queue full indicator output is in a full state.

7. A bus sequencing unit in a processing agent, comprising:

a cache having an input for data requests posted within the bus sequencing unit, a transaction queue system having an input for the data requests, and a a recycling mechanism in communication with the internal cache and the transaction queue system;

wherein the recycling mechanism returns to a requester a recycle signal corresponding to the data request whenever the data request implicates data associated with a pending external transaction;

wherein the transaction queue system includes an internal transaction queue; and wherein the transaction queue system further includes an external transaction queue.

8. A method of processing a data request in an agent, comprising:

posting a writeback request within the agent, the writeback request including an address, the address including a set field, comparing the set field of the writeback request with set fields associated with pending external transactions, responsive to a match between the set of the writeback request and a set of a pending external transaction, recycling the writeback request.

9. A method of processing a data request in an agent, comprising:

posting a writeback request within the agent, determining whether the writeback request implicates data that is implicated by a pending external transaction, if so, determining whether the pending external transaction also is a writeback transaction, and if so, recycling the posted writeback transaction.

10. A bus sequencing unit in a processing agent, comprising:

a cache having an input for data requests posted within the bus sequencing unit, a transaction queue system having an input for the data requests, and a recycling mechanism in communication with the internal cache and the transaction queue system;

wherein the cache is set associative cache and, further wherein the recycle mechanism inhibits a writeback that hits the cache when the transaction queue system stores a pending read transaction related to the same set as the writeback request.

11. A bus sequencing unit in a processing agent, comprising:

a cache having an input for data requests posted within the bus sequencing unit, a transaction queue system having an input for the data requests, and a recycling mechanism in communication with the internal cache and the transaction queue system;

wherein the cache includes cache entries, each cache entry including a state field representing a cache coherency state of data in the cache entry, and further wherein the recycling mechanism recycles any writeback request posted within the bus sequencing unit.

* * * * *